(12) United States Patent
Yanari

(10) Patent No.: US 7,360,891 B2
(45) Date of Patent: Apr. 22, 2008

(54) GLASSES LENS DESIGNING METHOD, PRODUCTION METHOD FOR GLASSES LENS AND COMPUTER PROGRAM

(75) Inventor: Mitsuhiro Yanari, Tokyo (JP)

(73) Assignee: Nikon-Essilor Co., Ltd., Tokyo (JP)

( * ) Notice: Subject to any disclaimer, the term of this patent is extended or adjusted under 35 U.S.C. 154(b) by 358 days.

(21) Appl. No.: 10/530,403

(22) PCT Filed: Sep. 30, 2003

(86) PCT No.: PCT/JP03/12481

§ 371 (c)(1),
(2), (4) Date: Apr. 7, 2005

(87) PCT Pub. No.: WO2004/034130

PCT Pub. Date: Apr. 22, 2004

(65) Prior Publication Data

US 2006/0055877 A1    Mar. 16, 2006

(30) Foreign Application Priority Data

Oct. 8, 2002    (JP)    ............................. 2002-294811

(51) Int. Cl.
*G02C 7/02*    (2006.01)
(52) U.S. Cl. ...................................... 351/177
(58) Field of Classification Search ................. 351/177
See application file for complete search history.

(56) References Cited

U.S. PATENT DOCUMENTS

| | | | |
|---|---|---|---|
| 4,613,217 A | | 9/1986 | Fuerter et al. ............... 351/176 |
| 6,012,813 A | * | 1/2000 | Qi ............................... 351/176 |
| 6,382,789 B1 | * | 5/2002 | Baudart et al. .............. 351/177 |
| 2002/0018178 A1 | | 2/2002 | Shirayanagi et al. ........ 351/177 |
| 2002/0039171 A1 | | 4/2002 | Shtrayanartz et al. ........ 351/159 |
| 2005/0041205 A1 | * | 2/2005 | Yamakaji ..................... 351/177 |
| 2005/0179861 A1 | * | 8/2005 | Kitani et al. ................. 351/159 |

FOREIGN PATENT DOCUMENTS

| | | |
|---|---|---|
| AU | 2002253630 B2 | 11/2002 |
| EP | 0 061 918 A1 | 10/1982 |
| EP | 0 886 166 | 12/1998 |
| WO | WO 02/088828 | 7/2003 |

* cited by examiner

*Primary Examiner*—Jordan M. Schwartz
(74) *Attorney, Agent, or Firm*—Miles & Stockbridge P.C.

(57) ABSTRACT

1 indicates the rotating point of the eyeball, 2 indicates the first eye position, 3 indicates the second eye position, and 4 indicates the third eye position. The lines indicated by thick lines at the respective eye positions are the horizontal meridian and vertical meridian (principal meridian) of the cornea. As is seen from the figure, the directions of the horizontal meridian and vertical meridian of the cornea at the third eye position 4, in particular, do not coincide with the directions of the horizontal meridian and vertical meridian at the first eye position 1. In the present means, in order to perform aberration correction of the ophthalmic lens not only in the first eye position and second eye position but also in the third eye position under conditions that are suited to the prescription of the user and conditions of use, the prescription surface is made aspherical while taking into account the astigmatic axis of the eye at arbitrary eye positions in accordance with the laws of Donders-Listing. As a result, the prescription surface can be designed so that favorable optical characteristics can be obtained in the case of various specifications involving individual information such as the prescription of the ophthalmic lens user.

9 Claims, 8 Drawing Sheets

GLASSES LENS DESIGNING METHOD, PRODUCTION METHOD FOR GLASSES LENS AND COMPUTER PROGRAM

TECHNICAL FIELD

The present invention relates to an ophthalmic lens design method, an ophthalmic lens manufacturing method, and a computer program used in ophthalmic lens design.

BACKGROUND ART

Generally, the relationship between the apical curvature of an ophthalmic lens at which the astigmatic aberration of the light rays passing through the lens shows a minimum value and the apical refractive power on the optical axis of the lens (hereafter referred to as the "dioptric power") can be obtained, for example, from the Tscherning ellipse.

Specifically, it is well known that the occurrence of astigmatic aberration in the peripheral parts of the lens can be suppressed by adjusting the curvatures of both refractive surfaces of the lens to an optimal combination obtained by means of this Tscherning ellipse, and the optical performance drops conspicuously if a combination of curvatures of both refractive surfaces that departs greatly from this Tscherning ellipse is selected.

However, in cases where an optimal combination of curvatures of both refractive surfaces obtained by means of this Tscherning ellipse is used, the curvatures of the refractive surfaces of the lens surfaces are increased, and the thickness of the lens also tends to increase.

Accordingly, in ophthalmic lenses seen in recent years, because of problems in terms of reducing the lens thickness and problems in terms of external appearance, and also for convenience of manufacture and the like, curvatures that are smaller than the curvatures obtained by the optimal combination of curvatures have been selected in almost all cases as the refractive surface curvatures (hereafter called the "base curve") of lens surfaces on the object side (hereafter called the "outer surfaces").

Specifically, in cases where problems of optical performance and external appearance are taken into account, the practical range of the base curve of an ophthalmic lens is limited to a specified range in accordance with the dioptric power of the ophthalmic lens. Furthermore, in cases where the refractive surfaces are constructed only from spherical surfaces, it is impossible to solve the problems of maintaining the optical performance in the desired range and improving the external appearance at the same time. Currently, therefore, lenses in which astigmatic aberration and dioptric power error in the peripheral parts of the lens are corrected while reducing the curvature of the base curve and maintaining the thickness of the lens at a small value mainly by making one of the refractive surfaces of the lens aspherical constitute the mainstream of lenses.

Ordinarily, in the principal rays passing through the ophthalmic lens corresponding to the line of sight of the user, the astigmatic aberration of the principal rays can be expressed as follows where Dmax is the maximum principal refractive power and Dmin is the minimum principal refractive power.

$$|Dmax-Dmin|$$

Furthermore, the mean refractive power of the principal rays can be expressed as follows:

$$(Dmax+Dmin)/2$$

These are treated as important factors in the design of the ophthalmic lens. Accordingly, in conventional ophthalmic lenses, the correction of aberration has been accomplished using such astigmatic aberration, mean refractive power, maximum principal refractive power and minimum principal refractive power as parameters.

Incidentally it is a well-known fact that the refractive power in the direction of an arbitrary meridian on a plane perpendicular to the principal rays has maximum and minimum values, and that the meridian directions that give these maximum and minimum values are perpendicular to each other. Accordingly, in the present specification, the maximum value of the refractive power in these arbitrary principal rays is taken as the maximum principal refractive power, the minimum value of this refractive power is taken as the minimum principal refractive power, and this maximum principal refractive power and minimum principal refractive power are referred to collectively as the principal refractive power.

Furthermore, the direction of the principal meridian including the maximum principal refractive power is taken as the maximum principal direction, the direction of the principal meridian including the minimum principal refractive power is taken as the minimum principal direction, and the maximum principal direction and minimum principal direction are referred to collectively as the principal direction. Moreover, in the present invention, the units of the values that express the refractive power are all diopter units unless otherwise specifically noted.

In a conventional ophthalmic lens, because of the need for cost reduction and simplification from the standpoint of manufacture, a semi-product lens (hereafter referred to as a semi-finished lens) in which one of the refractive surfaces of the lens has been worked beforehand is used. The refractive surface that has not been worked beforehand is called the prescription surface. Specifically, by working the prescription surface of the semi-finished lens into a spherical or toric surface in accordance with the prescription of the ophthalmic lens user, it is possible to use the same semi-finished lens in common in a fixed diopter range. Accordingly, this plays a large role in cost reduction (reduction of working costs, warehousing, and the like).

Ordinarily, the shape of the refractive surface of the semi-finished lens whose working is finished beforehand is a spherical surface shape or an aspherical surface shape that is rotationally symmetrical with respect to the optical axis, and this spherical surface shape or aspherical surface shape is set as a spherical or aspherical surface shape with respect to a certain specified dioptric power within the common dioptric power range so that the aberration shows a minimum value. If this set dioptric power is taken as the standard dioptric power for this semi-finished lens, then the optical performance of the lens in the dioptric power range in the vicinity of this standard dioptric power is favorable; however, in a dioptric power range that is removed from this standard dioptric power, a deterioration in the optical performance especially in the peripheral parts of the lens cannot be avoided. Furthermore, the following drawback is also encountered: namely, in cases where correction of astigmatism is necessary, even if the dioptric power is the standard dioptric power, a deterioration in the optical performance in the peripheral parts of the lens cannot be avoided.

Recently, however, because of the development of techniques for freely working aspherical surfaces, it has also become possible to correct aberration by forming prescription surfaces that have conventionally been spherical or toric surfaces into aspherical surfaces, so that ophthalmic lenses in which the conditions of use by the user are taken into account and the prescription surfaces are made aspherical have been developed into products.

However, especially in the case of ophthalmic lenses that involve correction of astigmatism, the astigmatic dioptric power according to the prescription is included in the astigmatic aberration of the lens, and the principal direction of the astigmatic axis of the eye, which varies with the movement of the line of sight, must be taken into account.

In order to provide an ophthalmic lens that is optimal for the individual user in accordance with specifications and conditions of use that vary with each user, the mere evaluation of the optical performance according to the meridional image plane and sagittal image plane, astigmatic aberration and mean refractive power conventionally used in the design of ophthalmic lenses is insufficient. In addition to the conventional evaluation of optical performance, torsion along the astigmatic axis of the eye and the principal direction of the principal refractive power of the lens must be taken into account, and a plurality of different types of optical performance must be simultaneously improved, in order to provide an ophthalmic lens that is optimal for each individual user. However, a so-called trade-off relationship may exist among different types of optical performance; consequently, it is difficult to reduce all aberration to a minimum value. Accordingly, it is necessary to achieve a refractive surface design which is such that a balance is obtained between different types of optical performance, so that an optimal optical performance is obtained overall.

Conventionally, in order to obtain a balance between different types of optical performance, designers have considered and judged various performance values. However, in order to design ophthalmic lenses by optimizing the optical performance for individual users, it is also necessary to automate such judgments by means of a computer.

The present invention was devised in light of such circumstances; it is an object of the present invention to provide a method for designing prescription surfaces so that a favorable optical performance can be obtained in various specifications accompanying individual information such as prescriptions for ophthalmic lens users, and an ophthalmic lens manufacturing method using this design method.

DISCLOSURE OF THE INVENTION

The first invention that is used to achieve the object described above is a method for designing ophthalmic lenses in which at least one surface among the set of refractive surfaces on the object side and eye side in the mounted state has a spherical or aspherical surface shape that is formed beforehand, and at least one refractive surface has an aspherical surface shape, this ophthalmic lens design method being characterized in that design is performed so that the shape of the refractive surface whose shape is not formed beforehand among the set of refractive surfaces is an aspherical surface shape which is such that the aberration of the ophthalmic lens is corrected according to the laws of Donders-Listing in accordance with at least the refractive power that is necessary for refractive correction of the user or the refractive power that is necessary for astigmatic correction, or both.

Furthermore, in the present specification and claims, the term "whose shape is molded (formed) beforehand" refers to the fact that the shape of this surface is determined in the semi-product stage, so that subsequent working is unnecessary. Furthermore, the term "whose shape is not formed (i.e., is not molded) beforehand" refers to the fact that although molding into a specified shape is performed in the semi-product stage, it is a prerequisite that further working is required in order to use this as a final product.

The laws of Donders-Listing are laws that relate to the rotational motion of the eye and eye positions. In these laws, the rotational motion of the eye that accompanies movement of the line of sight is expressed by a continuation of rotational motion which is performed about a rotational axis that passes through the rotating point and that is perpendicular to the line of sight at the first eye position; it is indicated that the arbitrary eye position that is achieved by means of this rotation is definitively determined regardless of the movement path of the line of sight. Furthermore, the rotational axis of the eyeball in this case is located on a plane that is perpendicular to the line of sight at the first eye position, and this plane is called the Listing's plane.

FIG. 1 is a diagram which shows the eye positions generated by the Donders-Listing rotation and the positions of the horizontal meridian and vertical meridian of the cornea in this case projected onto the Listing's plane. In FIG. 1, 1 indicates the rotating point of the eyeball, 2 indicates the first eye position, 3 indicates the second eye position, and 4 indicates the third eye position. The lines indicated by thick lines at the respective eye positions are the horizontal meridian and vertical meridian (principal meridian) of the cornea.

As is seen from FIG. 1, the directions of the horizontal meridian and vertical meridian of the cornea of the eye at the third eye position 4, in particular, do not coincide with the directions of the horizontal meridian and vertical meridian at the first eye position 1. Accordingly, in order to perform aberration correction of the ophthalmic lens not only at the first eye position and second eye position but also at the third eye position under conditions that are suited to the prescription of the user and conditions of use, it is necessary to make the prescription surface aspherical while taking into account the astigmatic axis of the eye at arbitrary eye positions in accordance with the laws of Donders-Listing. Furthermore, for details concerning the laws of Donders-Listing, see Igakushoinkan *"Me no Seirigaku"* ["Physiology of the Eye"] (Akira Hagiwara ed.) pp. 302-304.

In the present means, the shape of the refractive surface whose shape is not formed beforehand is designed in accordance with such laws of Donders-Listing so that this is an aspherical surface shape that corrects the aberration of the ophthalmic lens in accordance with at least the refractive power that is necessary for refractive correction of the user or the refractive power that is necessary for astigmatic correction of the user, or both. Accordingly, correction of the aberration of the ophthalmic lens at the third eye position, in particular, is appropriately performed, so that an ophthalmic lens that has favorable optical performance overall can be designed.

The second invention that is used to achieve the object described above is the first invention, which is characterized in that an arbitrary meridian of the refractive power necessary for refractive correction of the user is taken as a standard meridian in arbitrary principal rays passing through the plane of the ophthalmic lens, and the shape of the refractive surface whose shape is not formed beforehand is determined so that $\Delta$Pall expressed by Equation (1) below shows a minimum value or a specified value or less, where $E(\alpha)$ is the refractive power in the meridian direction that is required for the refractive correction of the eye of the user in the meridian direction at an arbitrary angle of $\alpha$ from the standard meridian, and $D(\alpha)$ is the refractive power in the meridian direction of the lens.

$$\Delta Pall = \int_a^b |\Delta P(\alpha)| d\alpha \quad (1)$$

Here, $\Delta P(\alpha)$ is a function expressed as $\Delta P(\alpha)=D(\alpha)-E(\alpha)$, and a and b are values that satisfy the equation $b-a=n\pi$, where n is a natural number.

In order to consider the refractive power in the direction of an arbitrary meridian on a plane perpendicular to the line of sight, observations are performed in an x-y-z coordinate system in which the x axis is taken in the direction of the optical axis corresponding to the line of sight, the y axis is taken in the maximum principal direction with respect to the astigmatic axis of the eye, and the z axis is taken in the direction of the minimum principal direction [with respect to the astigmatic axis of the eye. Here, Emax is the maximum refractive power required for the refractive correction of the eye, and Emin is the minimum refractive power required for the refractive correction of the eye.

Ordinarily, Emax and Emin express the refractive powers required for refractive correction and astigmatic correction. For example, in the case of an eye with a prescription in which the spherical surface dioptric power S=−2.00D and the astigmatic dioptric power C=−3.00D, Emax and Emin are expressed as Emax=−2.00 (diopter) and Emin=−5.00 (diopter).

Below, a case in which the standard meridian of the present invention is taken along the z axis will be described with reference to FIG. 2. If the refractive power required for the refractive correction of the eye in the direction of a meridian at an angle of $\alpha$ about the x axis with reference to the z axis (hereafter referred to as the "abnormal dioptric power of refraction") is designated as $E(\alpha)$, this $E(\alpha)$ can be expressed as follows:

$$E(\alpha)=E\max\cdot\sin^2\alpha+E\min\cdot\cos^2\alpha$$

If the refractive power of the lens in the direction of a meridian at an angle of $\alpha$ about the x axis with reference to the z axis is designated as $D(\alpha)$ in a case where the angle formed by the maximum principal meridian of the light rays that are incident on the eye and the minimum principal meridian of this eye is designated as $\theta$, then this $D(\alpha)$ can be expressed as follows:

$$D(\alpha)=D\max\cdot\cos^2(\alpha-\theta)+D\min\cdot\sin^2(\alpha-\theta)$$

$\alpha$ and $\theta$ in this case are taken as positive in the counterclockwise direction in the positive direction of the x axis.

Here, in the present means, in a case where the absolute value of the difference between the abnormal dioptric power of refraction of the eye $E(\alpha)$ in the direction of a meridian at an angle of $\alpha$ about the x axis with reference to the z axis and the refractive power $D(\alpha)$ of the lens is designated as $\Delta P(\alpha)$, the sum of $\Delta P(\alpha)$ in the range of $a\leq\alpha\leq b$ is called the total residual refractive power error, and is treated as an aberration that is used in the optimization of the optical performance.

Specifically, if this total residual refractive power error is designated as $\Delta Pall$, then this $\Delta Pall$ can be expressed by the following conditional equation:

$$\Delta Pall = \int_a^b |\Delta P(\alpha)| d\alpha \quad (1)$$

Here, $\Delta P(\alpha)$ is a function that can be expressed as $$\begin{aligned}\Delta P(\alpha) &= D(\alpha) - E(\alpha)\\ &= (D\max\cdot\cos^2(\alpha-\theta)+D\min\cdot\sin^2(\alpha-\theta)) -\\ &\quad (E\max\cdot\sin^2\alpha+E\min\cdot\cos^2\alpha)\end{aligned}$$

and a and b are values that satisfy [the equation $b-a=n\pi$, where n is a natural number.

For example, assuming that $\Delta P(\alpha)$ is such that $D(\alpha)\geq E(\alpha)$ in the interval [a, c], $D(\alpha)<E(\alpha)$ in the interval [c, d], and $D(\alpha)\geq E(\alpha)$ in the interval [d, b], then $\Delta Pall$ can be expressed as follows:

$$\Delta Pall = \left\{\int_a^c [D(\alpha)-E(\alpha)]d\alpha + \int_c^d [E(\alpha)-D(\alpha)]d\alpha + \int_d^b [D(\alpha)-E(\alpha)]d\alpha\right\}$$

The total residual refractive power error $\Delta Pall$ is the sum of $\Delta P(\alpha)$ in the direction of an arbitrary meridian of the eye in specified principal rays when the user has mounted the ophthalmic lens, and is a new aberration quantity which includes the residual astigmatic aberration felt by the eye of the user, and the residual mean refractive power error.

Accordingly, in the present means, as a result of this total residual refractive power error $\Delta Pall$ being introduced as a new aberration evaluation method that is used in the optimization of the optical performance, and this value being suppressed to zero or a small value, the optimization of a balanced optical performance can be achieved while taking into account the laws of Donders-Listing. Specifically, the refractive power required for refractive correction and astigmatic correction of the eye, and the alleviation of twisting in the respective principal directions, can be simultaneously achieved. In the present means, furthermore, the automation of calculations for optimizing the optical performance is facilitated.

This has been difficult in conventional methods for performing automated calculations for the optimization of astigmatic aberration and aberration arising from the mean refractive power. It is desirable to use the residual astigmatic aberration or residual mean refractive power error in order to perform an evaluation that takes the astigmatic dioptric power of the eye into account. However, there are also many conditions that make it impossible to achieve a favorable correction of both the residual astigmatic aberration and residual mean refractive power error at the same time, and there are cases in which the correction of one of these aberrations causes a deterioration in the other aberration.

In order to obtain an optimal optical performance in such cases, the designer must consider the permissible values of both of these aberrations, and strike a balance between these aberrations. However, it is difficult to correct the residual astigmatic aberration and residual mean refractive power error, which may adopt various values depending on the conditions, while taking into account the overall balance of the optical performance. Especially in the case of a system in which calculations for optimizing the optical performance are automatically performed for each order without any need for human judgment by the designer or the like during the optimization calculations, it is difficult to perform an automatic judgment so that stable results are always obtained. However, by using the total residual refractive power error in the present invention as a judgment value, it is more easily possible to obtain a balanced favorable optical performance even in the case of an automated optimization calculation system that does not require human judgment.

Furthermore, besides simulation means such as a general DLS method, it would also be possible to use some other appropriate optimization method as means for minimizing ΔPall. This is also true in cases where specified values are minimized or reduced to a specified value or lower in the second means or third means described later.

Moreover, in the present means, ΔPall is noted in integral form; however, giving consideration to the simplification of calculations, it would also be possible to handle ΔPall as the sum of discrete values as shown below, and it goes without saying that this method is within an equivalent scope of the present means.

Specifically, by dividing the interval of b−a=nπ and designating the division numbers as i, it is possible to express ΔPall as follows if β is set equal to (b−a)/i.

$$\Delta Pall = \sum_{m=0}^{i} \Delta P(m\beta + a)$$
$$= \Delta P(a) + \Delta P(\beta + a) + \Delta P(2\beta + a) + \ldots + \Delta P((i-1)\beta + a) + \Delta P(b)$$

In this case, by skillfully selecting the division number i, it is possible to simplify the calculations while keeping the calculation error of the value obtained within a practical range, and obtaining results comparable to those of an integral form. It goes without saying that beginning with this method, methods performing numerical calculations equivalent to actually performed integration are included in an equivalent scope of the present means.

The third invention that is used to achieve the object described above is the first invention, which is characterized in that an arbitrary meridian of the refractive power necessary for refractive correction of the user is taken as a standard meridian in arbitrary principal rays passing through the plane of the ophthalmic lens, and the shape of the refractive surface whose shape is not formed beforehand is determined so that ΔPav expressed by Equation (2) below shows a minimum value or a specified value or less, where E(α) is the refractive power in the meridian direction that is required for the refractive correction of the eye of the user in the meridian direction at an arbitrary angle of α from the standard meridian, and D(α) is the refractive power in the meridian direction of the lens.

$$\Delta Pav = \frac{1}{|b-a|} \int_{a}^{b} |\Delta P(\alpha)| d\alpha \qquad (2)$$

Here, ΔP(α) is a function expressed as ΔP(α)=D(α)−E(α), and a and b are values that satisfy the equation b−a=nπ, where n is a natural number.

In the present means, a value obtained by dividing the total residual refractive power error ΔPall in the second means by |b−a| is called the mean residual refractive power error, and this is expressed as ΔPav. Furthermore, the shape of the refractive surface whose shape is not formed beforehand is determined so that this ΔPav is minimized or is made to be a specified value or less.

Since a and b are values that are determined prior to the calculations, |b−a| is a constant. Consequently, the present means are basically equivalent to the second means, and exhibit exactly the same operational effects.

Furthermore, in the present means, ΔPav is noted in integral form; however, giving consideration to the simplification of calculations, it would also be possible to handle ΔPav as the sum of discrete values as shown below, and it goes without saying that this method is within an equivalent scope of the present means.

Specifically, by dividing the interval of b−a=nπ and designating the division numbers as i, it is possible to express ΔPav as follows if β is set equal to (b−a)/i.

$$\Delta Pav = \frac{1}{|b-a|} \sum_{m=0}^{i} \Delta P(m\beta + a)$$
$$= \frac{1}{|b-a|} [\Delta P(a) + \Delta P(\beta + a) + \Delta P(2\beta + a) + \ldots + \Delta P((i-1)\beta + a) + \Delta P(b)]$$

In this case, by skillfully selecting the division number i, it is possible to simplify the calculations while keeping the calculation error of the value obtained within a practical range, and obtaining results comparable to those of an integral form. It goes without saying that beginning with this method, methods performing numerical calculations equivalent to actually performed integration are included in an equivalent scope of the present means.

The fourth invention that is used to achieve the object described above is the first invention, which is characterized in that an arbitrary meridian of the refractive power necessary for refractive correction of the user is taken as a standard meridian in arbitrary principal rays passing through the plane of the ophthalmic lens, and the shape of the refractive surface whose shape is not formed beforehand is determined so that at least one of the values ΔAS or ΔMP satisfying the following conditional equations shows a minimum value or a specified value or less, where ΔPmax is the maximum value and ΔPmin is the minimum value of ΔP′(α)=D(α)−E(α) in the range of a≦α≦b or b≦α≦a, with E(α) being the refractive power in the meridian direction that is required for the refractive correction of the eye of the user in the meridian direction at an arbitrary angle of α from the standard meridian, and D(α) being the refractive power in the meridian direction of the lens.

Here, $\Delta AS = |\Delta Pmax - \Delta Pmin|$ \hfill (3)

$\Delta MP = (\Delta Pmax + \Delta Pmin)/2$ \hfill (4)

and a and b are values that satisfy the equation b−a=nπ, where n is an arbitrary integer excluding zero.

In the present means, the difference between the abnormal dioptric power of refraction of the eye in the direction of a meridian at an angle of α about the x axis with reference to the z axis in FIG. 2 and the refractive power of the lens is designated as the residual refractive power error ΔP′(α). Here, this ΔP′(α) is expressed as ΔP′(α)=D(α)−E(α), the maximum value of $\Delta P'(\alpha)$ in the range of $a \leq \alpha \leq b$ or $b \leq \alpha \leq a$ is designated as $\Delta P\max$, the minimum value is designated as $\Delta P\min$, and $\Delta P\max$ and $\Delta P\min$ are viewed as the maximum value and minimum value of the refractive power error felt by the user when wearing this ophthalmic lens.

Accordingly, $\Delta P\max$ is taken as the maximum residual refractive power error, $\Delta P\min$ is taken as the minimum residual refractive power error, and the following conditional equations are obtained from $\Delta P\max$ and $\Delta P\min$.

Where $\Delta AS$ is the residual astigmatic aberration of the ophthalmic lens, this $\Delta AS$ is expressed as $$\Delta AS = |\Delta P\max - \Delta P\min| \quad (3)$$

Furthermore, where $\Delta MP$ is the residual mean refractive power error of the ophthalmic lens, this $\Delta MP$ is expressed as $$\Delta MP = (\Delta P\max + \Delta P\min)/2 \quad (4)$$

In the present means, by using at least the residual astigmatic aberration $\Delta AS$ or residual mean refractive power error $\Delta MP$, or both, in the optimization of the optical performance, evaluation of the astigmatic aberration and mean refractive power excluding the astigmatic component of the eye is made possible while taking the laws of Donders-Listing into account (which is difficult in the case of conventional aberration evaluation).

Ideally, it is desirable to minimize both the value of Equation (3) and the value of Equation (4); however, depending on the lens conditions, it may be impossible to realize this. In this case, the shape of the refractive surface whose shape is not formed beforehand is determined so that one or the other of these values is minimized. Of course, under conditions which are such that the range of one of the values is within the permissible range, the system may also be devised so that the other value is minimized.

The fifth invention that is used to achieve the object described above is an ophthalmic lens manufacturing method which is characterized in that this method has a process which is such that in a lens in which at least one surface among the set of refractive surfaces on the object side and eye side in the mounted state is a refractive surface having a spherical or aspherical surface shape that is formed beforehand, the shape of the refractive surface whose shape is not formed beforehand is designed in accordance with the ophthalmic lens design method according to any of the first through fourth inventions, and the refractive surface whose shape is not formed beforehand is worked in accordance with this design data.

In the present means, an ophthalmic lens with a favorable optical performance can be manufactured in various specifications accompanying individual information such as prescriptions for the ophthalmic lens users.

The sixth invention that is used to achieve the object described above is a method for manufacturing an ophthalmic lens using as an element material a semi-product ophthalmic lens in which at least one surface among the set of refractive surfaces on the object side and eye side in the mounted state is a refractive surface having a spherical or aspherical surface shape that is formed beforehand, and at least one refractive surface has an aspherical surface shape, this ophthalmic lens manufacturing method being characterized in that this method has the steps of attaching the semi-product ophthalmic lens to a shape working apparatus, and working the refractive surface of the semi-product lens whose shape has not been formed beforehand by means of the shape working apparatus on the basis of design data obtained by the method according to any of the first through fourth inventions to produce a finished product.

In the present means, the manufacture of ophthalmic lenses can be performed on the basis of the determined design data even in cases where the location or firm where the design data is determined is different. Accordingly, even if the person performing the working does not have means such as a computer program for performing the design work, this person can entrust such design work to a person having such means for performing design work, and can manufacture an ophthalmic lens utilizing the results.

The seventh invention that is used to achieve the object described above is the sixth invention which is characterized in that the design data is determined at a different location from the location where the shape working apparatus is present, and is, transmitted to the location where the shape working apparatus is present via a communication device.

In the present means, the design data is transmitted via communication means; accordingly, in cases where the manufacturer and designer are in mutually remote locations, e.g., in cases where the manufacturer and designer are firms in different countries, manufacture can be performed especially efficiently. Arbitrary means such as inter-computer communications by wire and facsimile can be used as communication means.

The eighth invention that is used to achieve the object described above is a computer program which determines the aspherical surface shape of the refractive surface of an ophthalmic lens, this computer program being characterized in that the calculation of the refractive power $E(\alpha)$ in the meridian direction required for refractive correction of the eye of the user in the direction of a meridian at an arbitrary angle of $\alpha$ from the standard meridian when an arbitrary meridian of the refractive power require for refractive correction of the user is taken as the standard meridian is performed for each arbitrary set of principal rays passing through the ophthalmic lens, the calculation of the refractive power $D(\alpha)$ in the meridian direction of the lens is performed for each arbitrary set of principal rays passing through the ophthalmic lens, and the aspherical surface shape of the refractive surface is determined on the basis of $E(\alpha)$ and $D(\alpha)$ so that the aberration of the ophthalmic lens shows a minimum value or a specified value or less in accordance with the laws of Donders-Listing.

In the present means, ophthalmic lenses that appropriately perform aberration correction at various eye positions can be designed by means of a computer.

BEST MODE FOR CARRYING OUT THE INVENTION

Embodiments of the present invention will be described below with reference to the figures and tables.

Table 1 shows lens data for a conventional ophthalmic lens whose object is astigmatic correction, in which the external diameter of the lens is 70 mm, the spherical surface refractive power is −2.00D, the refractive power in the direction of astigmatism is −4.00D, the astigmatic dioptric power is −2.00D, the first surface (which is the outer surface) is a spherical surface, and the second surface (which is the inner surface) is a toric surface.

TABLE 1

Conventional example of lens data

| | | |
|---|---|---|
| External diameter (mm) | | 70.0 |
| Center thickness (mm) | | 1.1 |
| Refractive index | | 1.665 |
| First surface curvature (diopter) | | 1.661 |
| Second surface curvature (diopter) | y direction | −3.663 |
| Second surface curvature (diopter) | z direction | −5.663 |
| Second surface aspherical surface coefficients | $A_{40}$ | 0.000E + 00 |
| (A mn) | $A_{60}$ | 0.000E + 00 |
| | $A_{80}$ | 0.000E + 00 |
| | $A_{22}$ | 0.000E + 00 |
| | $A_{42}$ | 0.000E + 00 |
| | $A_{62}$ | 0.000E + 00 |
| | $A_{04}$ | 0.000E + 00 |
| | $A_{24}$ | 0.000E + 00 |
| | $A_{44}$ | 0.000E + 00 |
| | $A_{06}$ | 0.000E + 00 |
| | $A_{26}$ | 0.000E + 00 |
| | $A_{08}$ | 0.000E + 00 |

Figure 1:
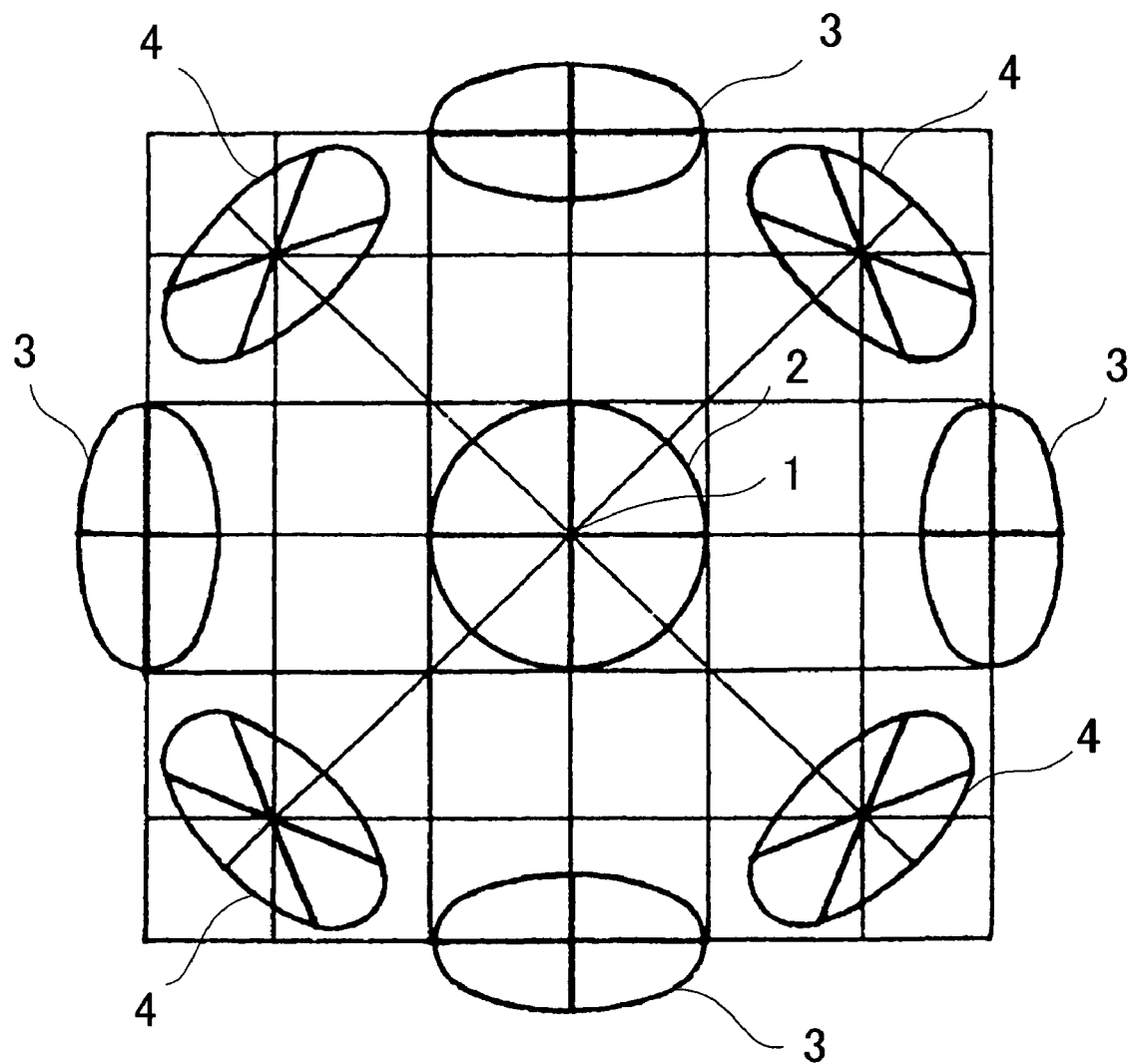
FIG. 1 is a diagram which shows the eye positions generated by Donders-Listing rotation and the positions of the horizontal meridian and vertical meridian of the cornea in this case projected onto the Listing's plane.
Figure 2:
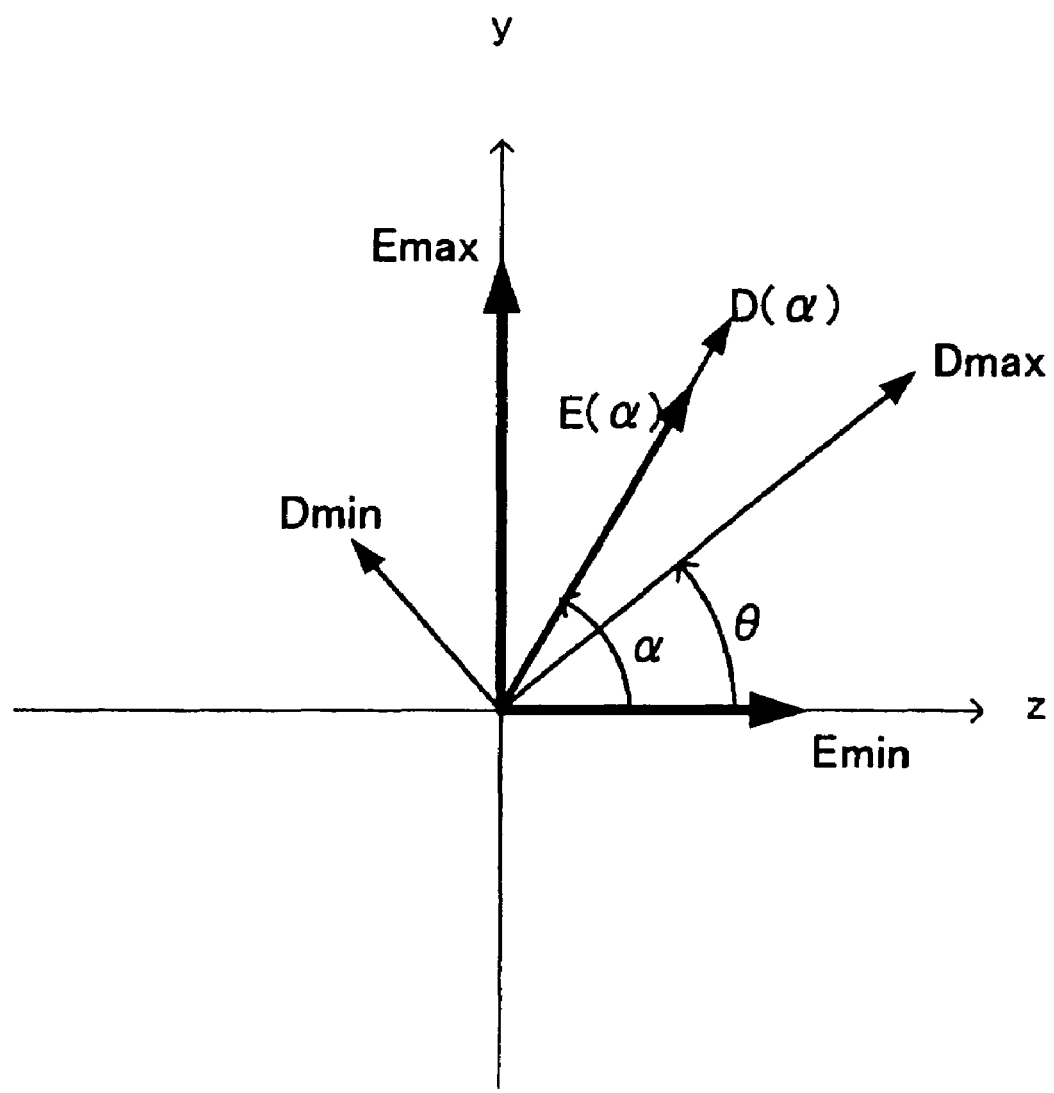
FIG. 2 is a diagram which is used to illustrate the refractive power in the direction of an arbitrary meridian on a plane perpendicular to the line of sight.
Figure 3:
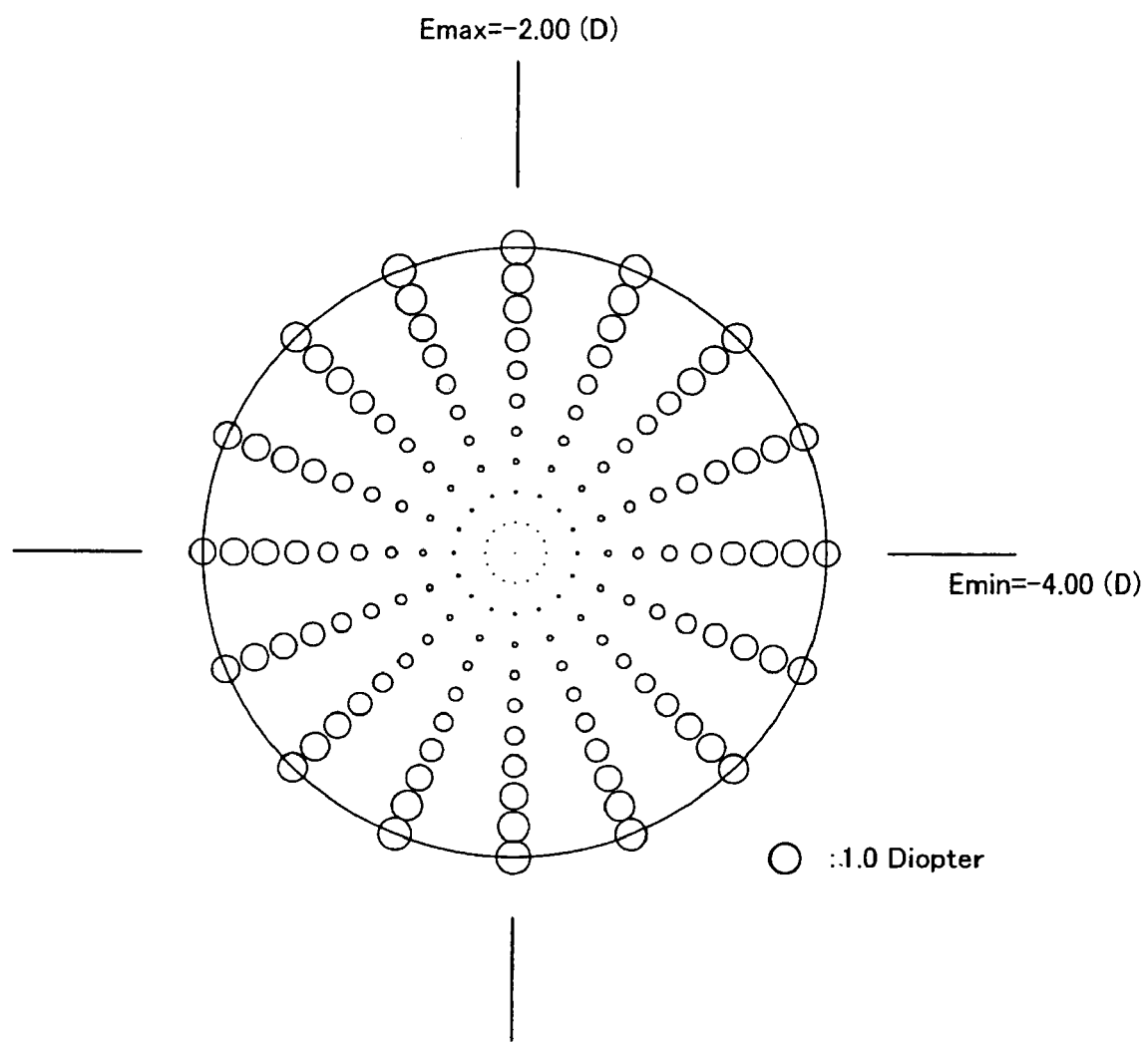
FIG. 3 is a distribution diagram of the mean residual refractive power error $\Delta P$av in a conventional example of an astigmatic lens.

FIG. 3 is a distribution diagram of the mean residual refractive power error ΔPav in the conventional example of an astigmatic lens shown in Table 1. The central portions of the small circles in the figure indicate the positions where the principal rays pass through the respective points within the lens plane, and the sizes of the small circles express the magnitude of the mean residual refractive power error ΔPav in the respective principal rays. As is seen from FIG. 3, the value of the mean residual refractive power error ΔPav increases from the center of the lens toward the peripheral portions of the lens.

Figure 4:
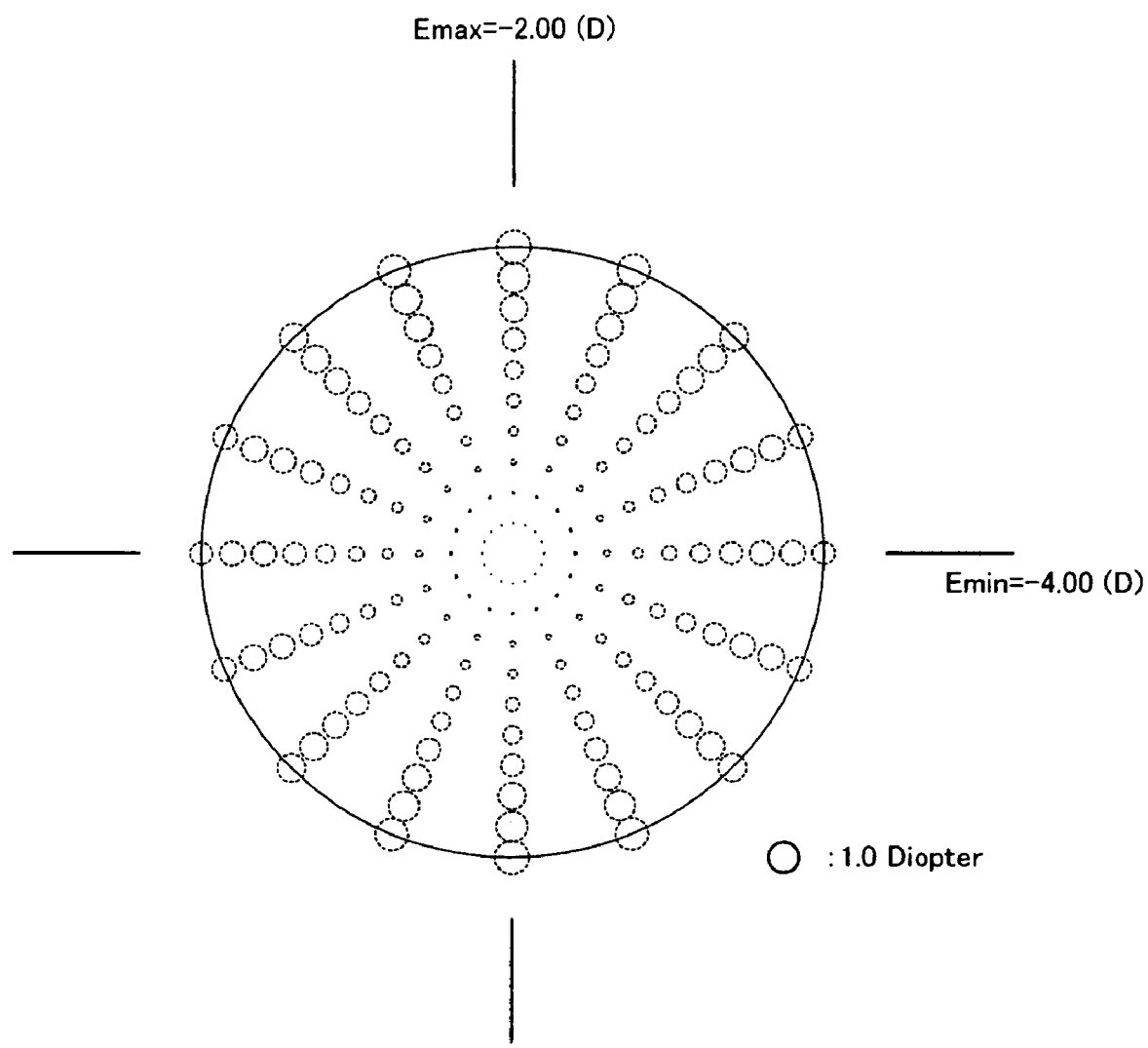
FIG. 4 is a distribution diagram of the residual mean refractive power error $\Delta MP$ in a conventional example of an astigmatic lens.

FIG. 4 is a distribution diagram of the residual mean refractive power error ΔMP in the conventional example of an astigmatic lens shown in Table 1. The central portions of the small circles in the figure indicate the positions where the principal rays pass through the respective points within the lens plane, and the sizes of the small circles express the magnitude of the residual mean refractive power error ΔMP in the respective principal rays. Furthermore, in cases where the small circles are drawn by means of solid lines, this indicates that ΔMP has a positive value, and in cases where the small circles are drawn by means of dotted lines, this indicates that ΔMP has a negative value. As is seen from FIG. 4, the value of the residual mean refractive power error ΔMP increases from the center of the lens toward the peripheral parts of the lens.

Figure 5:
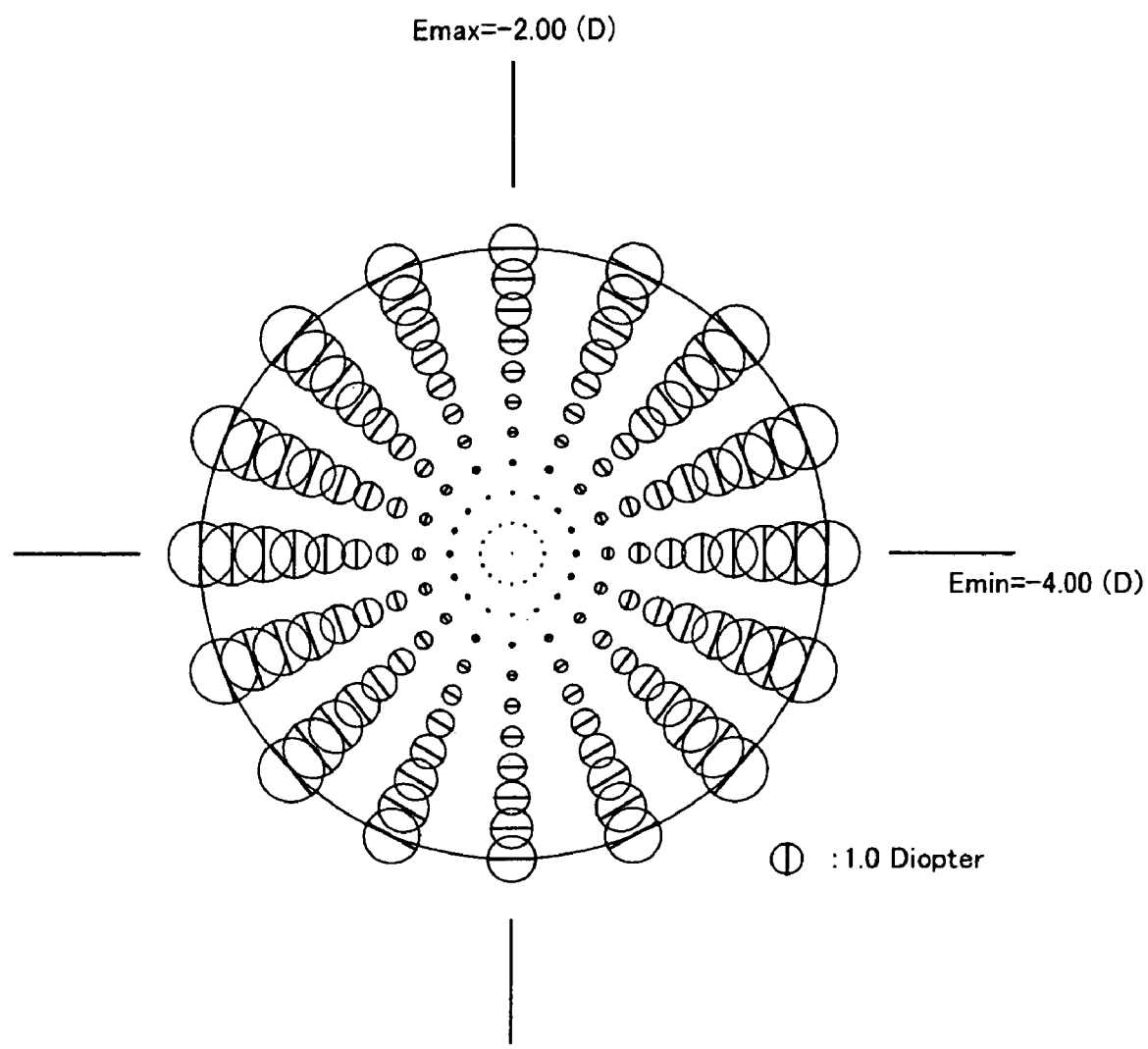
FIG. 5 is a distribution diagram of the residual astigmatic aberration $\Delta AS$ in a conventional example of an astigmatic lens.

FIG. 5 is a distribution diagram of the residual astigmatic aberration ΔAS in the conventional example of an astigmatic lens shown in Table 1. The central portions of the small circles in the figure indicate the positions where the principal rays pass through the respective points within the lens plane, and the sizes of the small circles express the magnitude of the residual astigmatic aberration ΔAS in the respective principal rays. Furthermore, the straight lines within the small circles indicate the meridian direction of the maximum residual refractive power error ΔPmax for the minimum principal direction of the eye. As is seen from FIG. 5, the value of the residual astigmatic aberration ΔAS increases conspicuously from the center of the lens toward the peripheral parts of the lens.

Table 2 shows lens data for an embodiment of the present invention in which the external diameter of the lens is 70 mm, the spherical surface refractive power is −2.00D, the refractive power in the astigmatic direction is −4.00D, the astigmatic dioptric power is −2.00D, the first surface (which is the outer surface) is a spherical surface, and the second surface (which is the inner surface) is an aspherical toric surface.

This embodiment of the present invention is a result of automated optimization calculations in which the mean residual refractive power error ΔPav was viewed as being especially important, the system was devised so that this value was minimized, and the calculations were further performed using the residual astigmatic aberration ΔAS and the residual mean refractive power error ΔMP as parameters for optimization so that these values were also as small as possible.

Specifically, the mean residual refractive power error ΔPav was minimized, and in this case, if the residual astigmatic aberration ΔAS and residual mean refractive power error ΔMP were within permissible ranges, it was considered that a solution was obtained. On the other hand, if the residual astigmatic aberration ΔAS and the residual mean refractive power error ΔMP were not within permissible ranges, steps were taken so that the mean residual refractive power error ΔPav was increased to a value slightly greater than the minimum value, thus ensuring that the residual astigmatic aberration ΔAS and residual mean refractive power error ΔMP were ultimately within permissible ranges. Furthermore, in the calculations, it was assumed that a=0 and b=π.

Furthermore, the descriptive equation of the aspherical portion used in the second surface in the present embodiment was as shown below.

$$x = \Sigma A_{mn} y^m z^n$$
$$= A_{00} + A_{01} z^1 + A_{02} z^2 + \ldots + A_{10} y^1 + A_{11} y^1 z + A_{12} y^1 z^2 + \ldots$$
$$+ A_{20} y^2 A_{21} y^2 z^1 + A_{22} y^2 z^2 + \ldots + A_{mn} y^m z^n$$

Accordingly, the second surface in this embodiment of the present invention has a shape obtained by adding an aspherical surface shape using the values of the aspherical surface coefficients described in Table 2 in the aspheric surface descriptive equation described above to the toric surface constituting the basis.

TABLE 2

Example of lens data for embodiment

| | | |
|---|---|---|
| External diameter (mm) | | 70.0 |
| Center thickness (mm) | | 1.1 |
| Refractive index | | 1.665 |
| First surface curvature (diopter) | | 1.661 |
| Second surface curvature (diopter) | y direction | −3.663 |
| Second surface curvature (diopter) | z direction | −5.663 |
| Second surface aspherical surface coefficients (A mn) | $A_{40}$ | −2.488E-07 |
| | $A_{60}$ | 7.511E-11 |
| | $A_{80}$ | −1.192E-14 |
| | $A_{22}$ | −5.123E-07 |
| | $A_{42}$ | 7.317E-11 |
| | $A_{62}$ | −1.732E-17 |
| | $A_{04}$ | −4.801E-07 |
| | $A_{24}$ | 2.186E-10 |
| | $A_{44}$ | 1.991E-14 |
| | $A_{06}$ | 1.810E-10 |
| | $A_{26}$ | −3.803E-14 |
| | $A_{08}$ | −3.602E-14 |

Figure 6:
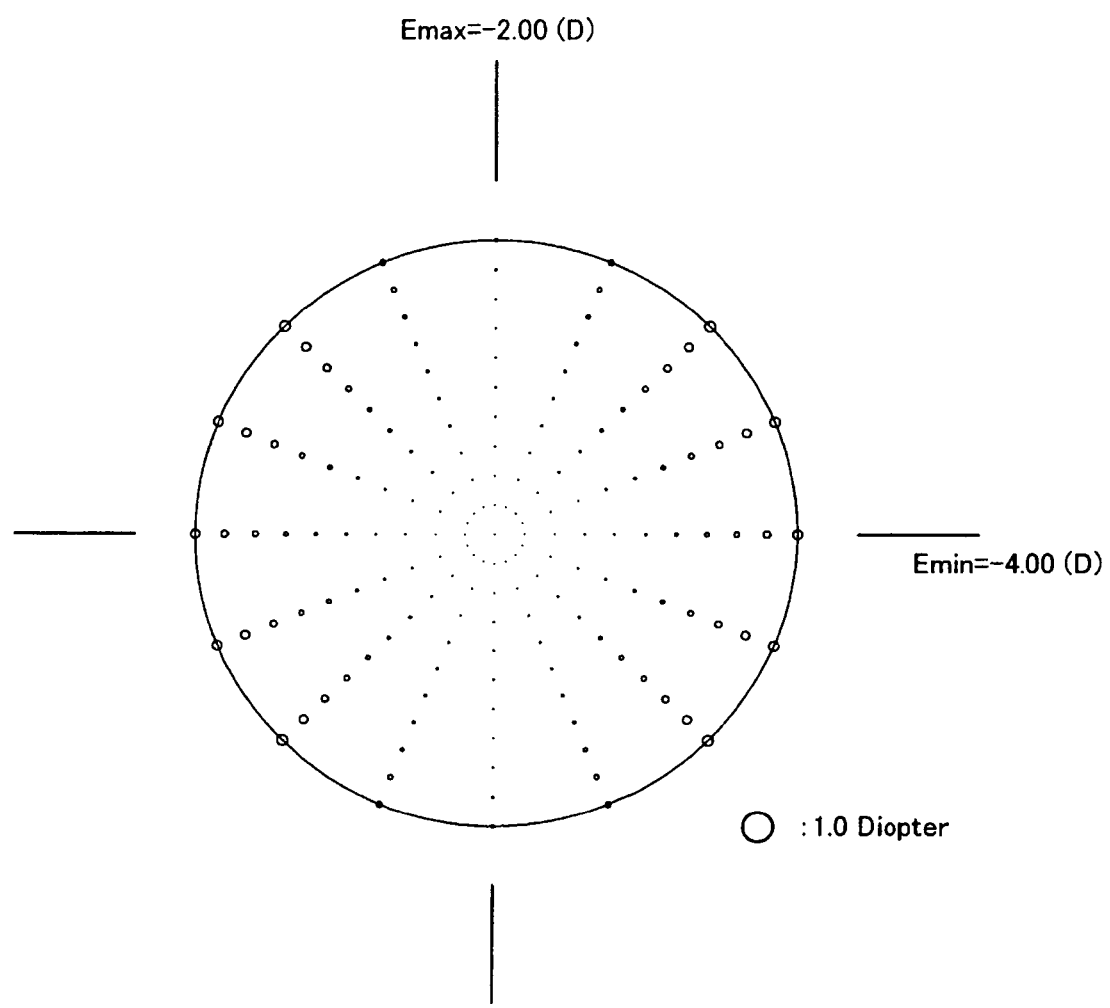
FIG. 6 is a distribution diagram of the mean residual refractive power error ΔPav in an astigmatic lens constituting an embodiment of the present invention.

FIG. 6 is a distribution diagram of the mean residual refractive power error ΔPav of the astigmatic lens of the embodiment of the present invention shown in Table 2. The method of description is the same as in FIG. 3. As is seen from this figure, the value of the mean residual refractive power error ΔPav is suppressed to a small value over the entire surface of the lens.

Figure 7:
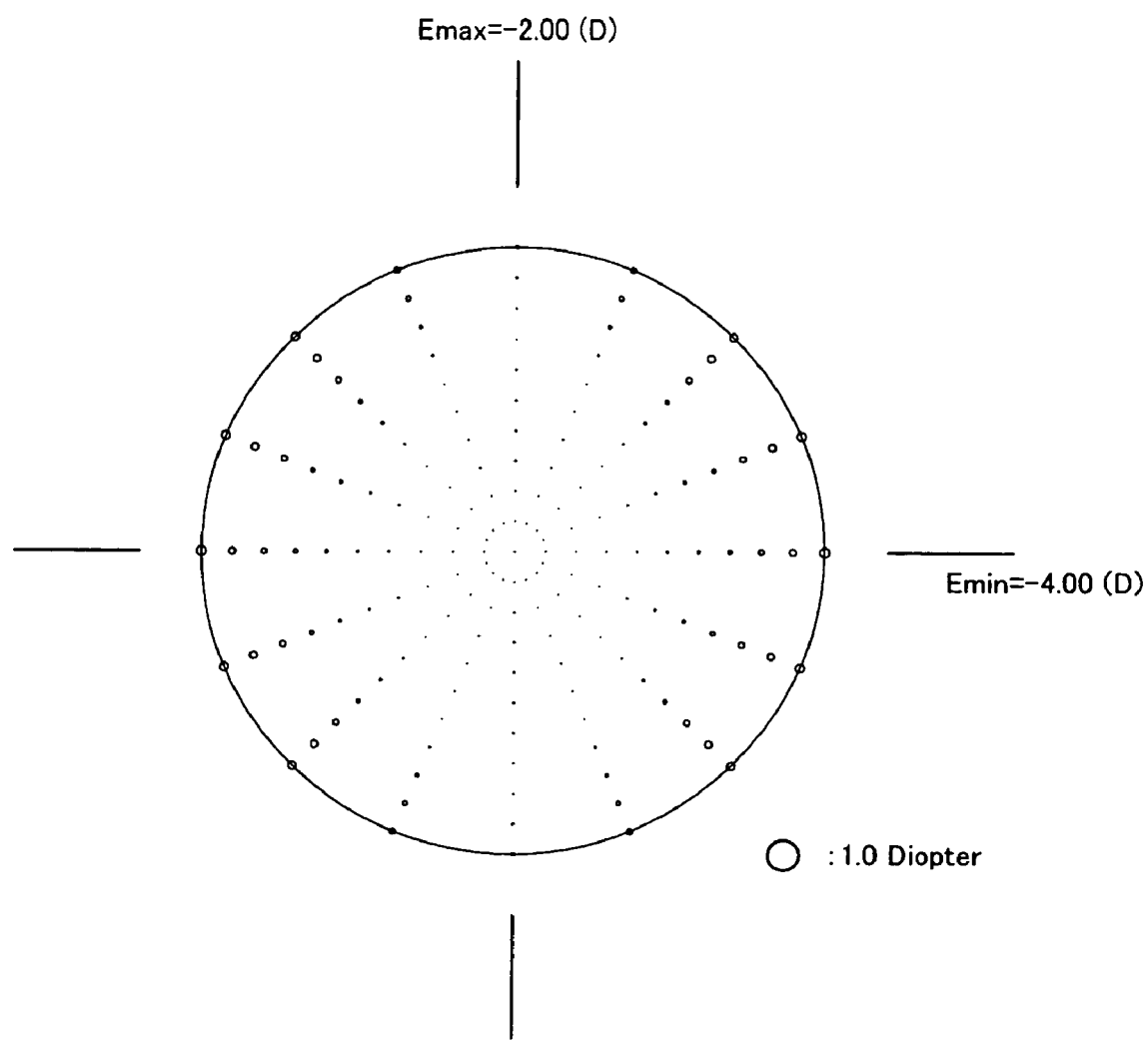
FIG. 7 is a distribution diagram of the residual mean refractive power error ΔMP in an astigmatic lens constituting an embodiment of the present invention.

FIG. 7 is a distribution diagram of the residual mean refractive power error ΔMP in the astigmatic lens of the embodiment of the present invention shown in Table 2. The method of description is the same as in FIG. 4. As is seen from this figure, the value of the residual mean refractive power error ΔMP is suppressed to a small value over the entire surface of the lens.

Figure 8:
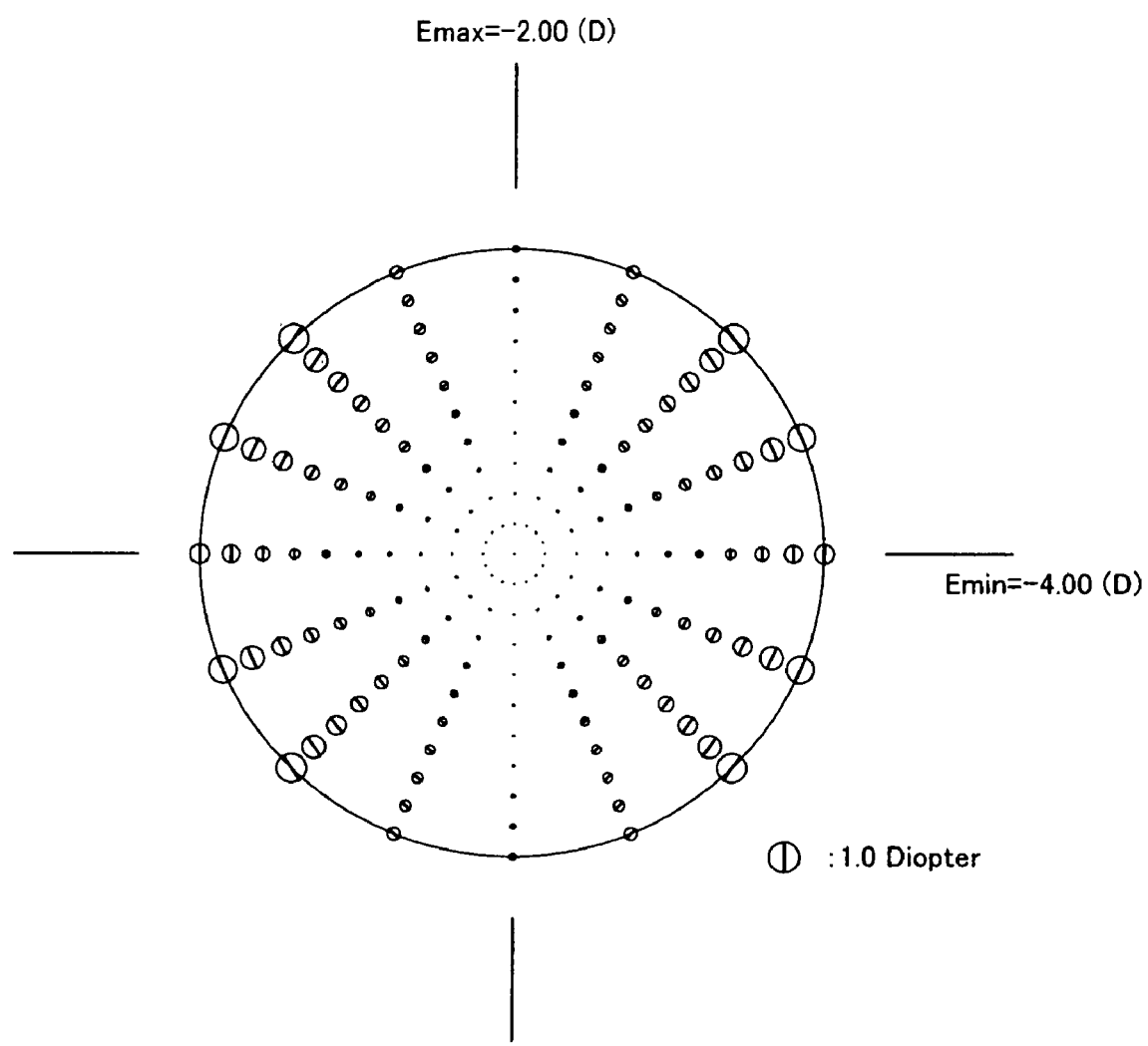
FIG. 8 is a distribution diagram of the residual astigmatic aberration ΔAS in an astigmatic lens constituting an embodiment of the present invention.

FIG. 8 is a distribution diagram of the residual astigmatic aberration ΔAS in the astigmatic lens of the embodiment of the present invention shown in Table 2. The method of description is the same as in FIG. 5. As is seen from this figure, the value of the residual astigmatic aberration ΔAS is suppressed to a small value over the entire surface of the lens.

Furthermore, the astigmatic dioptric power axes may inherently adopt various values according to the prescription of the user; in the above description, however, in order to simplify the description, the principal meridian direction of the spherical surface dioptric power is taken in the vertical direction of the lens, and the principal meridian direction of the astigmatic dioptric power is taken in the horizontal direction of the lens. Nevertheless, it is clear that the present invention is effective regardless of the orientation of these astigmatic dioptric power axes.

In the embodiments described above, a spherical surface is used as the first surface, and a shape obtained by using the aspherical surface equation described above is used as the second surface. However, the present invention is not limited to such embodiments; it is clear that the present invention is effective for various shapes of the first surface and/or second surface, e.g., rotationally symmetrical aspherical surface shapes in general and spline surface shapes.

Moreover, with regard to the working apparatus used in the present invention, any arbitrary apparatus that is ordinarily used in the working of ophthalmic lenses may be appropriately used. Generally, in a shape working apparatus, the working of the refractive surfaces is performed while causing relative movement of the ophthalmic lens and working tool. Specifically, the shape working apparatus works the shape while controlling the amount of relative movement of the ophthalmic lens and working tool on the basis of the design data obtained by means of the present invention. Furthermore, an apparatus using a system which has a plurality of working tools, and which performs working while changing the working tool in accordance with the refractive surface that is being formed, may also be used as the shape working apparatus.

The invention claimed is:

1. A method for designing ophthalmic lenses in which at least one surface among the set of refractive surfaces on the object side and eye side in the mounted state has a spherical or aspherical surface shape that is formed beforehand, and at least one refractive surface has an aspherical surface shape, said method being characterized in that designing is performed so that the shape of the refractive surface whose shape is not formed beforehand among the set of refractive surfaces is an aspherical surface shape which is such that the aberration of the ophthalmic lens is corrected in consideration of the laws of Donders-Listing in accordance with at least the refractive power that is necessary for refractive correction of the user or the refractive power that is necessary for astigmatic correction, or both, said method further being characterized in that an arbitrary meridian of the refractive power necessary for refractive correction of the user is taken as a standard meridian in arbitrary principal rays passing through the plane of the ophthalmic lens, and the shape of the refractive surface whose shape is not formed beforehand is determined so that ΔPall expressed by Equation (1) below shows a minimum value or a specified value or less, where E(α) is the refractive power in the meridian direction that is required for the refractive correction of the eye of the user in the meridian direction at an arbitrary angle of α from the standard meridian, and D(α) is the refractive power in the meridian direction of the lens $$\Delta Pall = \int_a^b |\Delta P(\alpha)| d\alpha \qquad (1)$$

where, ΔP(α) is a function expressed as ΔP(α)=D(α)−E(α), and a and b are values that satisfy the equation b−a =nπ, where n is a natural number.

2. A method for designing ophthalmic lenses in which at least one surface among the set of refractive surfaces on the object side and eye side in the mounted state has a spherical or aspherical surface shape that is formed beforehand, and at least one refractive surface has an aspherical surface shape, said method being characterized in that designing is performed so that the shape of the refractive surface whose shape is not formed beforehand among the set of refractive surfaces is an aspherical surface shape which is such that the aberration of the ophthalmic lens is corrected in consideration of the laws of Donders-Listing in accordance with at least the refractive power that is necessary for refractive correction of the user or the refractive power that is necessary for astigmatic correction, or both, and said method further being characterized in that an arbitrary meridian of the refractive power necessary for refractive correction of the user is taken as a standard meridian in arbitrary principal rays passing through the plane of the ophthalmic lens, and the shape of the refractive surface whose shape is not formed beforehand is determined so that ΔPav expressed by Equation (2) below shows a minimum value or a specified value or less, where E(α) is the refractive power in the meridian direction that is required for the refractive correction of the eye of the user in the meridian direction at an arbitrary angle of α from the standard meridian, and D(α) is the refractive power in the meridian direction of the lens $$\Delta Pav = \frac{1}{|b-a|}\int_a^b |\Delta P(\alpha)| d\alpha \qquad (2)$$

where, ΔP(α) is a function expressed as ΔP(α)=D(α)−E(α), and a and b are values that satisfy the equation b−a =nπ, where n is a natural nwnber.

3. A method for designing ophthalmic lenses in which at least one surface among the set of refractive surfaces on the object side and eye side in the mounted state has a spherical or aspherical surface shape that is formed beforehand, and at least one refractive surface has an aspherical surface shape, said method being characterized in that designing is performed so that the shape of the refractive surface whose shape is not formed beforehand among the set of refractive surfaces is an aspherical surface shape which is such that the aberration of the ophthalmic lens is corrected in consideration of the laws of Donders-Listing in accordance with at least the refractive power that is necessary for refractive correction of the user or the refractive power that is necessary for astigmatic correction, or both, and said method further being characterized in that an arbitrary meridian of the refractive power necessary for refractive correction of the user is taken as a standard meridian in arbitrary principal rays passing through the plane of the ophthalmic lens, and the shape of the refractive surface whose shape is not formed beforehand is determined so that at least one of the values ΔAS or ΔMP satisfying the following conditional equations shows a minimum value or a specified value or less, where ΔPmax is the maximum value and ΔPmin is the minimum value of ΔP'(α)=D(α)−E(α) in the range of a≦a≦b or b≦a≦a, with E(α) being the refractive power in the meridian direction that is required for the refractive correction of the eye of the user in the meridian direction at an arbitrary angle of α from the standard meridian, and D(α) being the refractive power in the meridian direction of the lens where, ΔAS =|ΔPmax−ΔPmin|  (3)

ΔMP=(ΔPmax+ΔPmin)/2  (4)

and a and b are values that satisfy the equation b−a=nπ, where n is an arbitrary integer excluding zero.

4. An ophthalmic lens manufacturing method designed in accordance with the ophthalmic lens design and design data obtained thereby according to any one of claims 1 through 3, which is characterized in that and method has a process which is such that in a lens in which at least one surface among the set of refractive surfaces on the object side and eye side in the mounted state is a refractive surface having a spherical or aspherical surface shape that is formed beforehand, the shape of the refractive surface whose shape is not formed beforehand is designed in accordance with said ophthalmic lens design method, and the refractive surface whose shape is not formed beforehand is worked in accordance with said design data.

5. A method for manufacturing an ophthalmic lens designed in accordance with the ophthalmic lens design and design data obtained thereby according to any one of claims 1 through 3, and using as an element material a semi-product ophthalmic lens in which at least one surface among the set of refractive surfaces on the object side and eye side in the mounted state is a refractive surface having a spherical or aspherical surface shape that is formed beforehand, and at least one refractive surface has an aspherical surface shape, said ophthalmic lens manufacturing method being characterized by steps of attaching the semi-product ophthalmic lens to a shape working apparatus, and working the refractive surface of the semi-product lens whose shape has not been formed beforehand by means of the shape working apparatus on the basis of said design data to produce a finished product.

6. The ophthalmic lens manufacturing method according to claim 5, which is characterized in that design data is determined at a different location from the location where the shape working apparatus is present, and is transmitted to a location where the shape working apparatus is present via a communication device.

7. A computer readable medium that stores a computer program which designs ophthalmic lenses according to the method for designing ophthalmic lenses of claim 1.

8. A computer readable medium that stores a computer program which designs ophthalmic lenses according to the method for designing ophthalmic lenses of claim 2.

9. A computer readable medium that stores a computer program which designs ophthalmic lenses according to the method for designing ophthalmic lenses of claim 3.

* * * * *